US009963076B1

(12) United States Patent
Bender et al.

(10) Patent No.: US 9,963,076 B1
(45) Date of Patent: May 8, 2018

(54) AUTO DEPLOYING STEP FOR VEHICLE TAILGATE

(71) Applicants: Frederick F Bender, South Lyon, MI (US); Antony Elliott, Clawson, MI (US); Michael J Squire, Burton, MI (US); Chad Vermeulen, Windsor (CA); Paul Gardiner, Amherstburg (CA); Daniel Teodorof, Windsor (CA)

(72) Inventors: Frederick F Bender, South Lyon, MI (US); Antony Elliott, Clawson, MI (US); Michael J Squire, Burton, MI (US); Chad Vermeulen, Windsor (CA); Paul Gardiner, Amherstburg (CA); Daniel Teodorof, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 0 days. days.

(21) Appl. No.: 15/343,338

(22) Filed: Nov. 4, 2016

(51) Int. Cl.
*B60R 3/02* (2006.01)
*B62D 33/03* (2006.01)

(52) U.S. Cl.
CPC ............... *B60R 3/02* (2013.01); *B62D 33/03* (2013.01)

(58) Field of Classification Search
CPC .. B60R 3/00; B60R 3/02; B60R 3/007; E06C 5/16; E06C 5/20
See application file for complete search history.

(56) References Cited

U.S. PATENT DOCUMENTS

| 1,129,238 | A | * | 2/1915 | Seitz | B60R 3/02 105/448 |
| 1,223,639 | A | * | 4/1917 | Swartsel | B60R 3/02 296/62 |
| 1,471,972 | A | * | 10/1923 | Miller | B60R 3/02 280/166 |
| 2,436,961 | A | * | 3/1948 | Gabriel | B60R 3/02 105/447 |
| 3,671,058 | A | * | 6/1972 | Kent | B60R 3/02 280/166 |
| 3,675,947 | A | * | 7/1972 | Blagg | B60D 1/363 280/477 |
| 3,806,161 | A | * | 4/1974 | Pollart | B60D 1/06 280/500 |
| 3,964,767 | A | * | 6/1976 | Williams | B60D 1/40 280/455.1 |
| 4,073,502 | A | | 2/1978 | Frank et al. | |
| 4,157,189 | A | * | 6/1979 | Poley | B60D 1/46 280/490.1 |

(Continued)

FOREIGN PATENT DOCUMENTS

WO 2003039910 A1 5/2003

*Primary Examiner* — Frank B Vanaman
(74) *Attorney, Agent, or Firm* — Ralph E Smith

(57) ABSTRACT

A step system, for a pickup truck having a tailgate movable between a closed position and an open position, includes a mounting bracket configured to couple to the pickup truck, and a link system pivotably coupled to the mounting bracket and configured to operably and mechanically couple to the tailgate such that movement of the tailgate from the closed position to the open position automatically pivots the link system from a stowed position beneath the pickup truck to a deployed position rear of the pickup truck. A step portion is coupled to the link system and configured to provide a step for an individual between the ground and the tailgate when the link system is in the deployed position.

15 Claims, 8 Drawing Sheets

(56) References Cited

U.S. PATENT DOCUMENTS

| | | | | |
|---|---|---|---|---|
| 4,199,756 | A | * | 4/1980 | Dito .................. B60D 1/36 340/431 |
| 4,202,562 | A | * | 5/1980 | Sorenson ............ B60D 1/06 280/415.1 |
| 4,639,032 | A | | 1/1987 | Barbour |
| 5,154,125 | A | * | 10/1992 | Renner ............... B61D 23/02 105/349 |
| 6,830,257 | B2 | | 12/2004 | Leitner |
| 7,377,563 | B1 | * | 5/2008 | Demick ............... B60R 3/02 280/164.1 |
| 7,441,790 | B2 | | 10/2008 | Lechkun |
| 7,637,519 | B2 | | 12/2009 | Leitner et al. |
| 8,056,913 | B2 | | 11/2011 | Kuntze et al. |
| 8,342,551 | B2 | | 1/2013 | Watson |
| 2002/0083868 | A1 | * | 7/2002 | Jeon .................. B60R 3/02 108/11 |
| 2008/0042396 | A1 | | 2/2008 | Watson et al. |
| 2012/0018975 | A1 | * | 1/2012 | Salmon ............... B60R 3/02 280/166 |
| 2014/0008889 | A1 | | 1/2014 | Leitner et al. |
| 2015/0123375 | A1 | * | 5/2015 | Leitner ............... B60R 3/02 280/166 |

* cited by examiner

AUTO DEPLOYING STEP FOR VEHICLE TAILGATE

FIELD

The present application relates generally to vehicles and, more particularly, to an automatically deployed assistance step for a tailgate of a vehicle.

BACKGROUND

Pickup trucks typically include a truck bed accessible via a tailgate, which is movable between an open position and a closed position. However, due to the height of the truck bed relative to the ground, it may be difficult for an individual to access the truck bed without assistance. Accordingly, some pickup trucks include a side step located between the ground and the truck bed to provide an intermediate step for the individual. However, these side steps are typically fixed in position such that the ground clearance and approach angles at the rear of the pickup truck are compromised. Thus, while such step systems work well for their intended purpose, there remains a need for improvement in the art.

SUMMARY

In accordance with an example aspect of the invention, a step system for a pickup truck having a tailgate movable between a closed position and an open position is provided. In one exemplary implementation, the step system includes a mounting bracket configured to couple to the pickup truck, and a link system pivotably coupled to the mounting bracket and configured to operably and mechanically couple to the tailgate such that movement of the tailgate from the closed position to the open position automatically pivots the link system from a stowed position beneath the pickup truck to a deployed position rear of the pickup truck, and movement of the tailgate from the open position to the closed position automatically pivots the link system from the deployed position to the stowed position beneath the pickup truck. A step portion is coupled to the link system and configured to i) provide a step for an individual between the ground and the tailgate when the link system is in the deployed position, and ii) be stowed beneath the pickup truck when the link system is in the stowed position.

In accordance with another example aspect of the invention, a vehicle is provided. The vehicle includes, in one exemplary implementation, a tailgate movable between a closed position and an open position, and a step system mechanically coupled to the tailgate and movable between a stowed position beneath the vehicle and a deployed position rear of the vehicle. The step system includes a step portion having a surface configured to provide a step between the ground and the tailgate when the step system is in the deployed position. The step system is in the stowed position when the tailgate is in the closed position, and movement of the tailgate to the open position mechanically pivots the step system to the deployed position, and movement of the tailgate from the open position to the closed position automatically mechanically pivots the step system from the deployed position to the stowed position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

Figure 1:
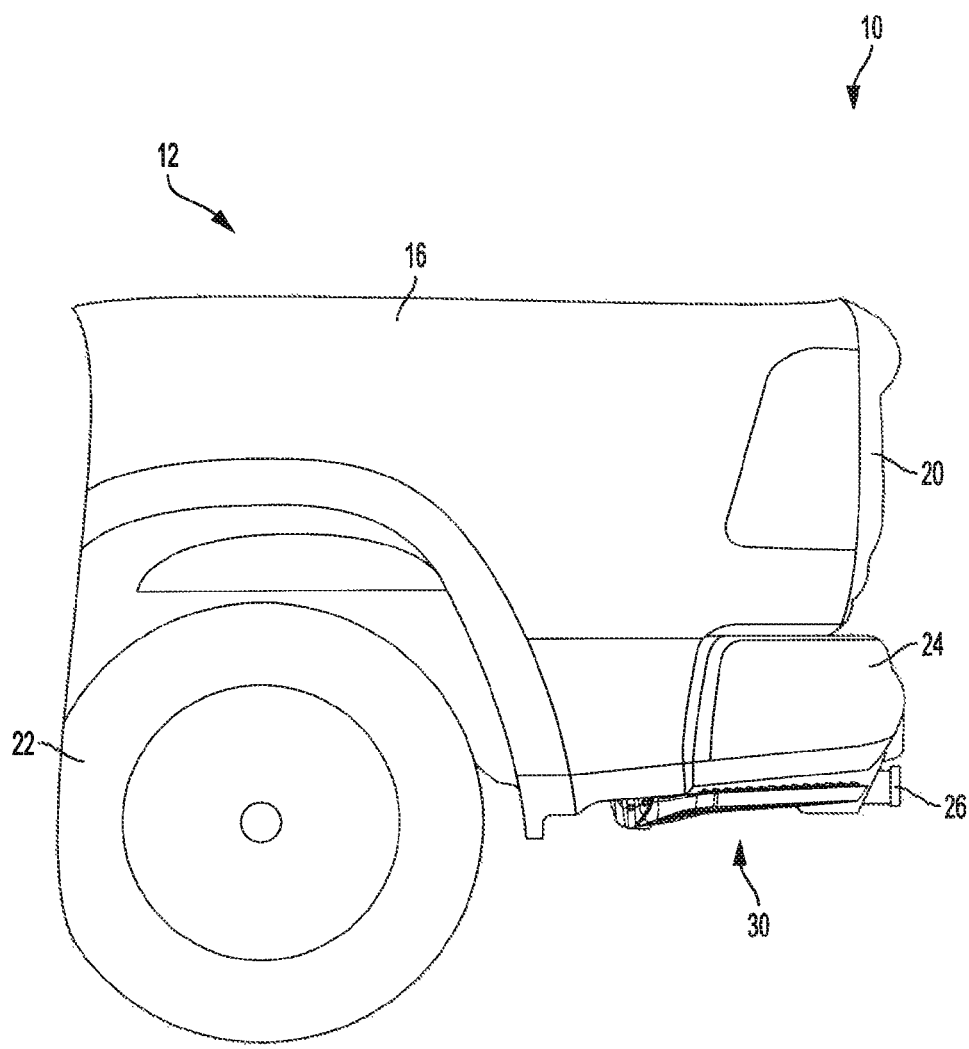
FIG. 1 is a side view of a vehicle having an example deployable step system in a retracted position, in accordance with the principles of the present disclosure.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed implementations and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure

DESCRIPTION

Figure 2:
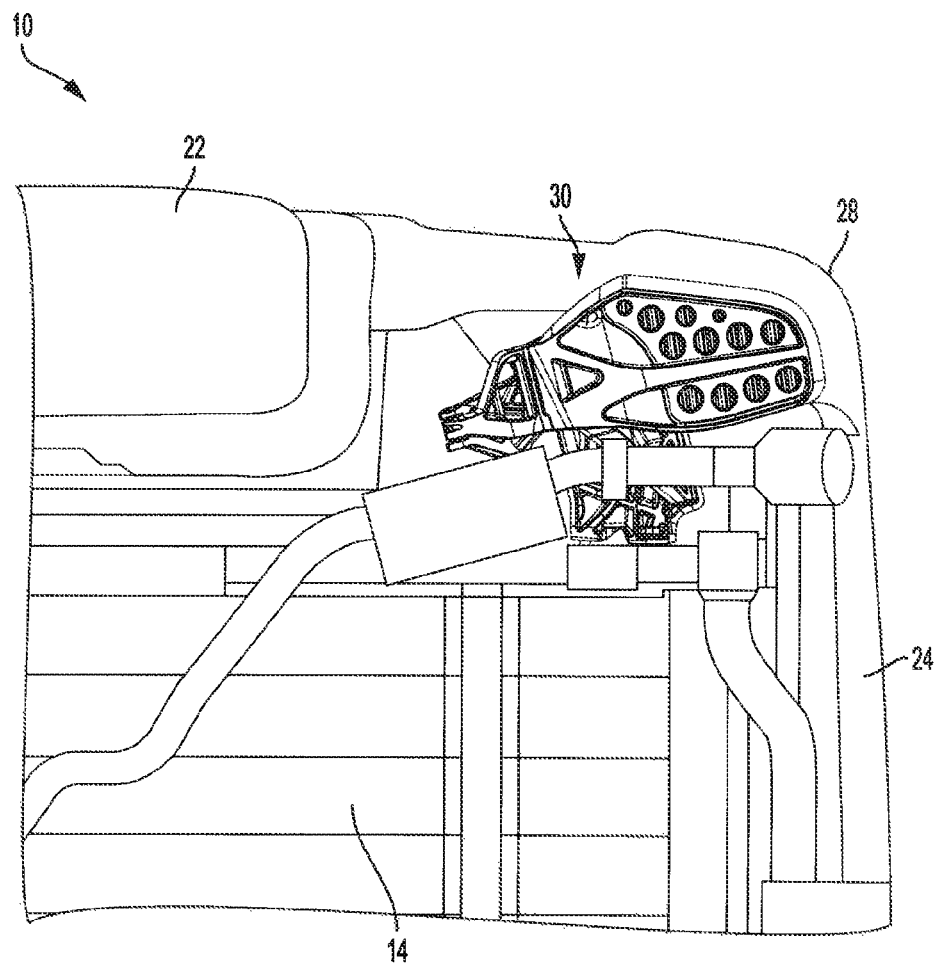
FIG. 2 is a bottom view of the vehicle and deployable step system shown in FIG. 1, in accordance with the principles of the present disclosure.
Figure 3:
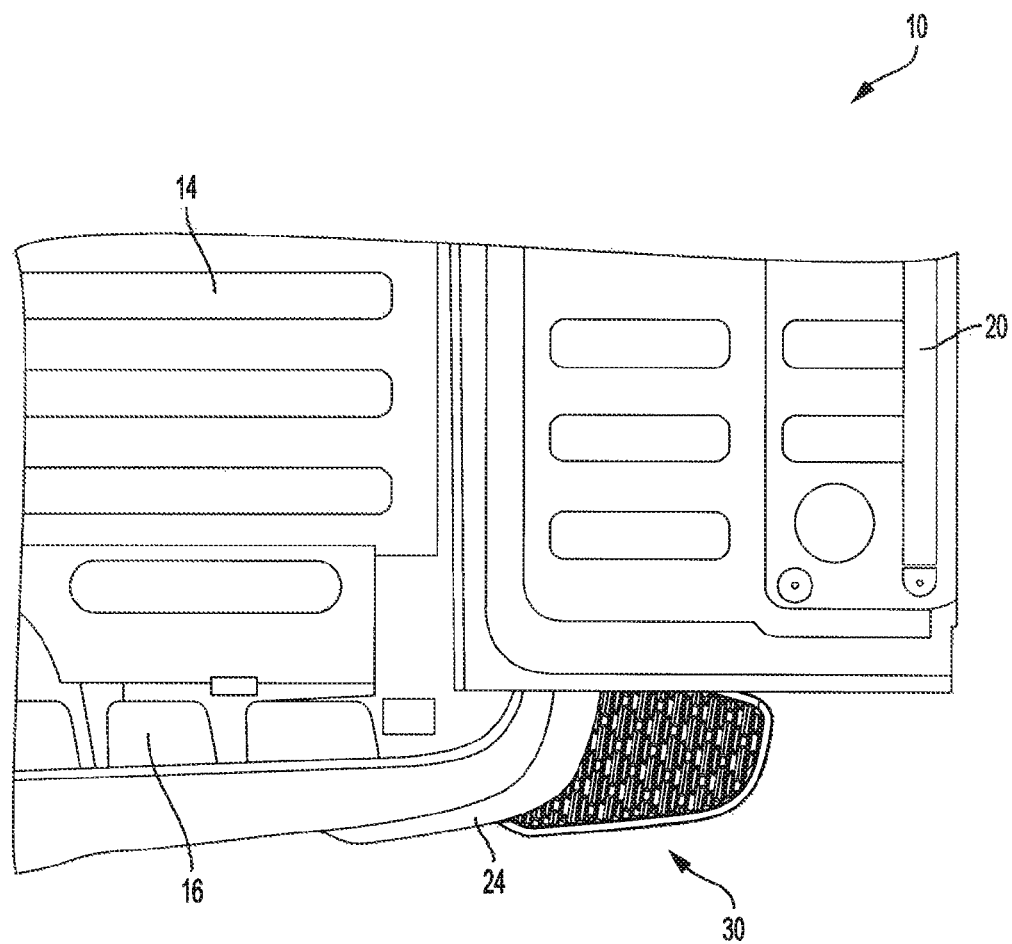
FIG. 3 is a top view of the vehicle and deployable step system of FIG. 1 in a deployed position, in accordance with the principles of the present disclosure.

With reference to FIGS. 1-3, an example vehicle 10 is illustrated having an automatically deployed step system 30 constructed in accordance with one example of the present disclosure. In the example embodiment, vehicle 10 is illustrated as a pickup truck. However, vehicle 10 may be any type of vehicle configured to accommodate an automatically deployable step system 30 as described herein.

In the illustrated embodiment, vehicle 10 includes a cargo bed assembly 12 utilized for storing and/or hauling cargo and includes, among other features, a truck box underbody structure 14 with three sidewalls 16 extending upwardly therefrom (only one shown). Underbody structure 14 is coupled to and supported by a chassis 18 (FIG. 4) of vehicle 10. In the illustrated embodiment, a tailgate 20 is movably coupled to cargo bed assembly 12 as a fourth sidewall and is configured to move between a closed position (see FIGS. 1 and 4) and an open position (see FIGS. 3 and 5).

As described herein in more detail, step system 30 is mechanically and operably coupled to tailgate 20 and is automatically moved from a retracted position to a deployed position when tailgate 20 is moved from the closed position to the open position.

Figure 4:
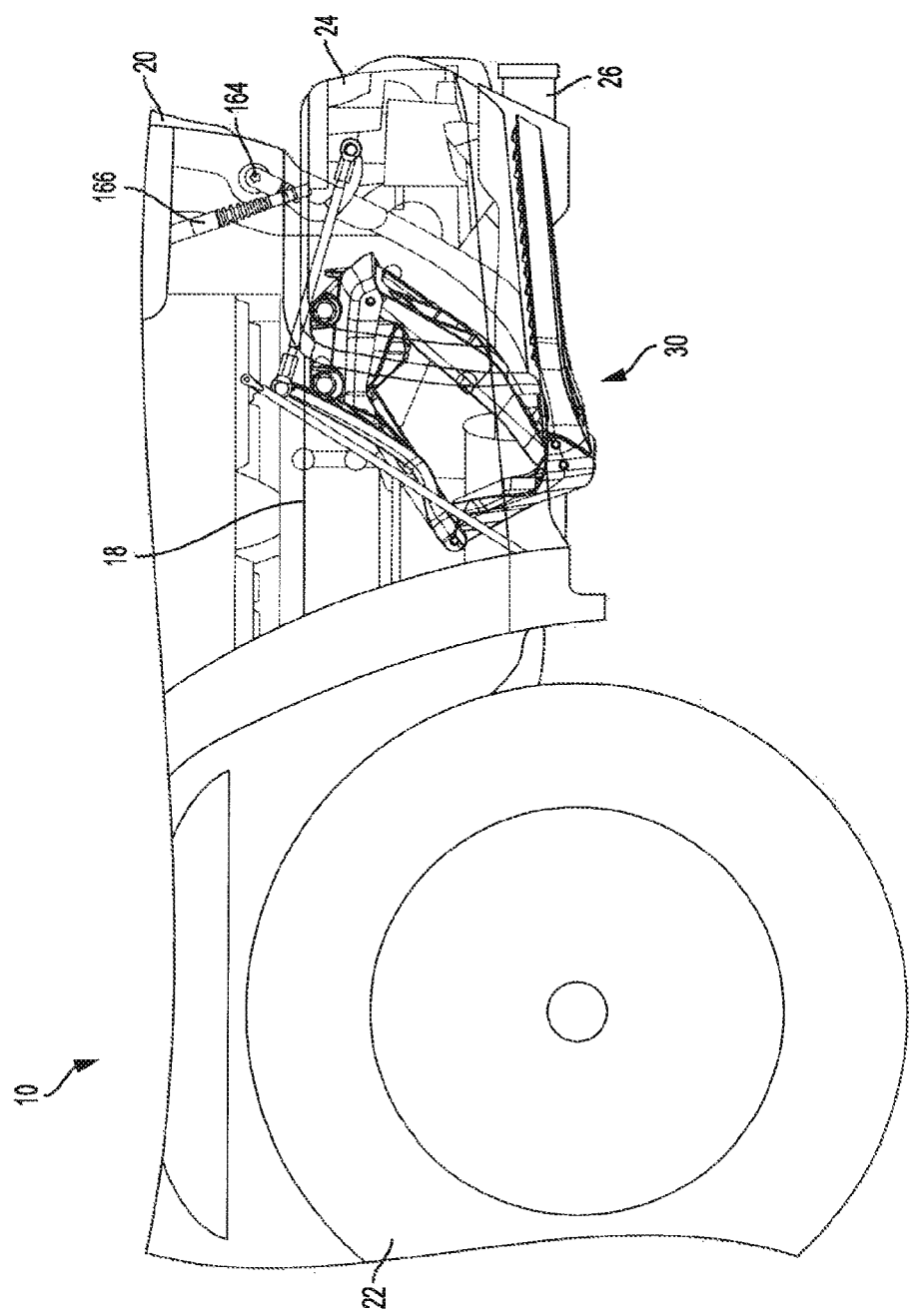
FIG. 4 is a cutaway side view of the vehicle and retracted step system shown in FIG. 1, in accordance with the principles of the present disclosure.
Figure 5:
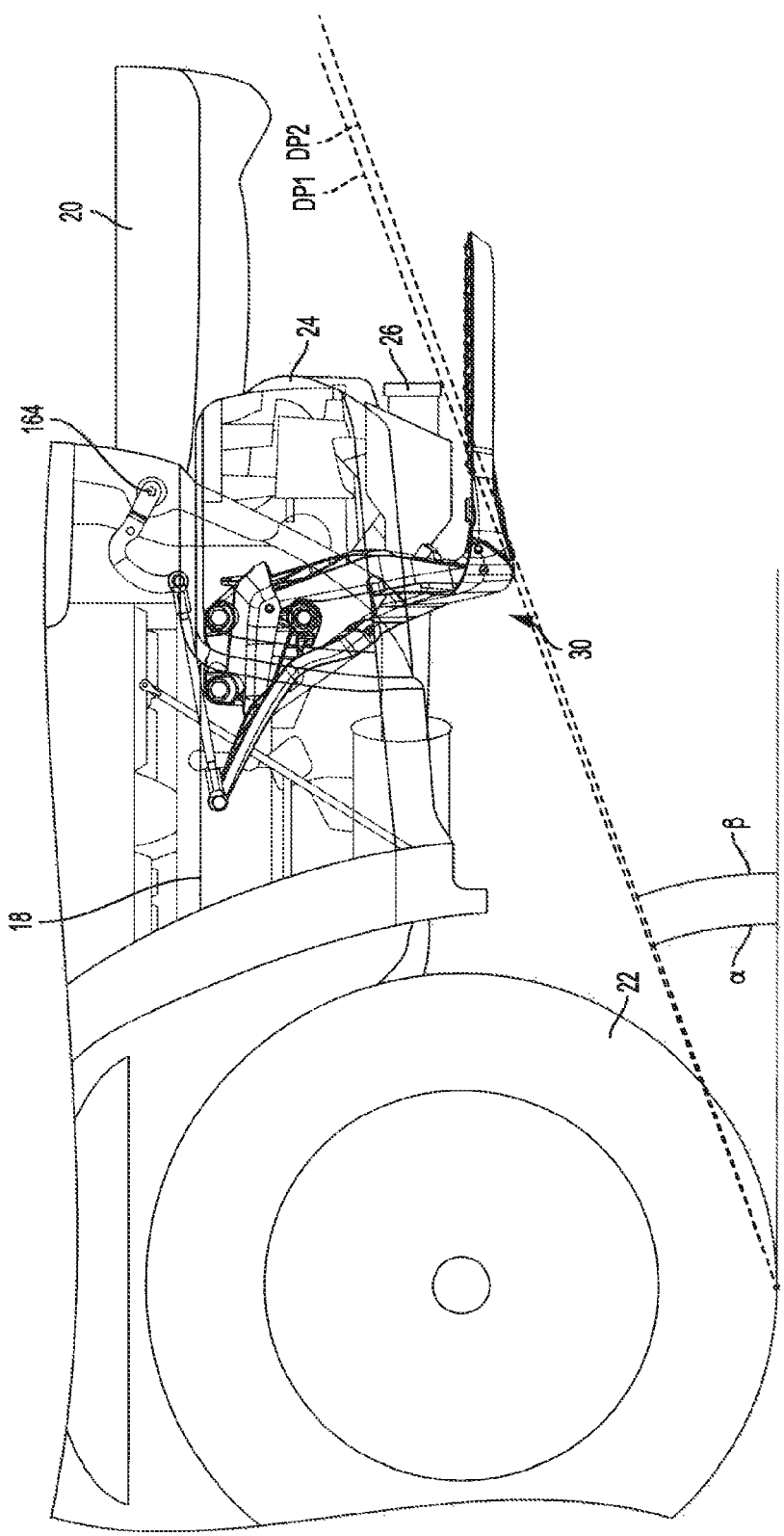
FIG. 5 is a cutaway side view of the vehicle and deployed step system shown in FIG. 3, in accordance with the principles of the present disclosure.

In the retracted position, illustrated in FIGS. 3 and 4, step system 30 is positioned in the space aft of a vehicle wheel 22, forward of a rear bumper 24, beneath truck box underbody structure 14, and above a departure plane 'DP1' of a vehicle trailer hitch 26 (see FIG. 5). In this way, step system 30 is conveniently stowed in the available space beneath the vehicle when in the retracted position (see FIGS. 1, 2, and 4). Moreover, as shown in FIG. 2, the outer profile of step system 30 is contained within or set inboard of the outer profile 28 of vehicle 10 when step system 30 is in the stowed position. As shown, the outer profile of step system 30 may be contoured with outer profile 28.

The step system 30 is then automatically deployed by tailgate 20 to a position rear of vehicle 10 when tailgate 20 is lowered to the open position. In this deployed position, step system 30 provides a step between the ground and tailgate 20 to provide a user step assistance to access cargo bed 12. As shown in FIG. 3, in the deployed position, step system 30 is at least partially positioned rearward of bumper 24 and outward of tailgate 20. This enables a user to maintain visual sight of the step system 30 while climbing onto or stepping down from the tailgate 20 or cargo bed 12 and facilitates preventing a "blind step" that could make it more difficult to use.

With additional reference to FIGS. 6-8, auto deployed step system 30 will be described in more detail. As shown in the illustrated example, step system 30 generally includes a mounting bracket 32, a forward pivot link 34, an aft pivot link 36, a tie or drive rod 38, a bell-crank lever 40, and a step assembly 42.

In the example embodiment, mounting bracket 32 generally includes a main body portion 50 and an arm portion 52 extending outwardly therefrom. Main body portion 50 is configured to be disposed against chassis 18 and generally includes an inner side 54 and an outer side 56. First, second, and third apertures 58, 60, 62 extend through main body portion 50 and are each configured to receive a fastener 64 (e.g., a bolt) to secure mounting bracket to vehicle chassis 18 and/or trailer hitch 26. Arm portion 52 includes a top cover 66 extending between main body portion 50 and a sidewall 68. As illustrated, sidewall 68 includes a first aperture 70 and a second aperture 72 configured to respectively receive pins 74, 76 therethrough to pivotably couple forward pivot link 34 to mounting bracket 32 about a pivot point 'P1'. Although not shown, main body portion outer side 56 includes apertures formed therein that are aligned with apertures 70, 72 and configured to receive one end of pin 74 or 76.

In the illustrated example, forward pivot link 34 generally includes a main body portion 80, a first pivot arm extension 82, a second pivot arm extension 84, and a third pivot arm extension 86. First pivot arm extension 82 is coupled to and extends from main body portion 80. First pivot arm extension 82 includes a first arm 88, a second arm 90, and a sleeve 92 extending therebetween. Sleeve 92 is tubular and is configured to be disposed between main body portion 50 and sidewall 68 such that sleeve 92 aligns with first aperture 70 and its corresponding aperture (not shown). As such, pin 74 extends through first aperture 70, sleeve 92, and the corresponding aperture formed in main body portion 50 to pivotably couple first pivot arm extension 82 to mounting bracket 32 at pivot point 'P1'.

Second pivot arm extension 84 includes a proximal end 94 coupled to main body portion 80, and a distal end 96 having a sleeve 98. As illustrated, sleeve 98 is tubular and configured to receive a pin or fastener 100 therein to pivotably couple second pivot arm extension 84 to drive rod 38 at a pivot point 'P2'.

Third pivot arm extension 86 includes a proximal end 102 coupled to main body portion 80, and a distal end 104 having opposed flanges or tabs 106. As shown in FIG. 8, each tab 106 includes an aperture 108 configured to receive a pin 110 therein to pivotably couple third pivot arm extension 86 to step assembly 42 at a pivot point 'P3'.

Aft pivot link 36 includes a main body 120 having a first end 122, an opposite second end 124, a top side 126, and a bottom side 128. First end 122 includes a tubular sleeve 130 configured to be disposed between main body portion 50 and sidewall 68 such that sleeve 130 aligns with second aperture 72 and its corresponding aperture (not shown). As such, pin 76 extends through second aperture 72, sleeve 130, and the corresponding aperture formed in main body portion 50 to pivotably couple first aft pivot link first end 122 to mounting bracket 32 at a pivot point 'P4'.

Aft pivot link second end 124 includes a tubular sleeve 132 configured to receive a pin 134 therein to pivotably couple second end 124 to step assembly 42 at a pivot point 'P5'. Aft pivot link top side 126 includes an aperture or bore (not shown) formed therein and configured to receive a stopper 136 (e.g., an elastomeric member) configured to provide a stop surface between forward pivot link 34 and aft pivot link 36 when step system 30 is in the retracted position. Similarly, aft pivot link bottom side 128 includes an aperture or bore 138 (FIG. 8) formed therein and configured to receive a stopper 140 (e.g., an elastomeric member) configured to provide a stop surface between aft pivot link 36 and step assembly 42 when step system 30 is in the retracted position and/or when step assembly 42 is forced upward by the ground or other object.

In the example embodiment, drive rod 38 generally includes a rod member 142 having a first fitting 144 at a first end and a second fitting 146 at a second end. First fitting 144 includes an aperture 148 configured to receive fastener 100 therein to pivotably couple drive rod 38 to second pivot arm extension 84 at pivot point 'P2'. Second fitting 146 includes an aperture 150 configured to receive a pin or fastener 152 therein to pivotably couple drive rod 38 to lever 40 at a pivot point 'P6'.

Figure 6:
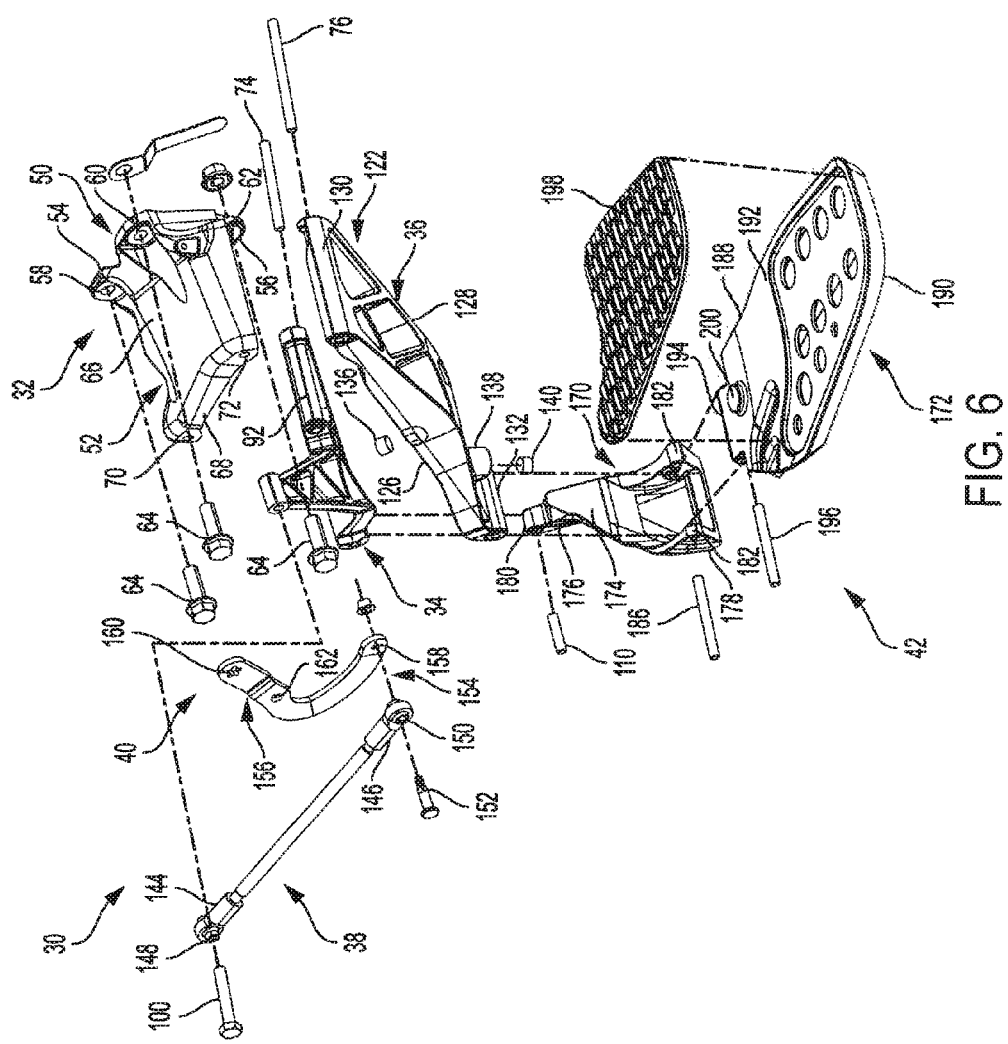
FIG. 6 is an exploded view of the example deployable step system shown in FIGS. 1-5, in accordance with the principles of the present disclosure.
Figure 7:
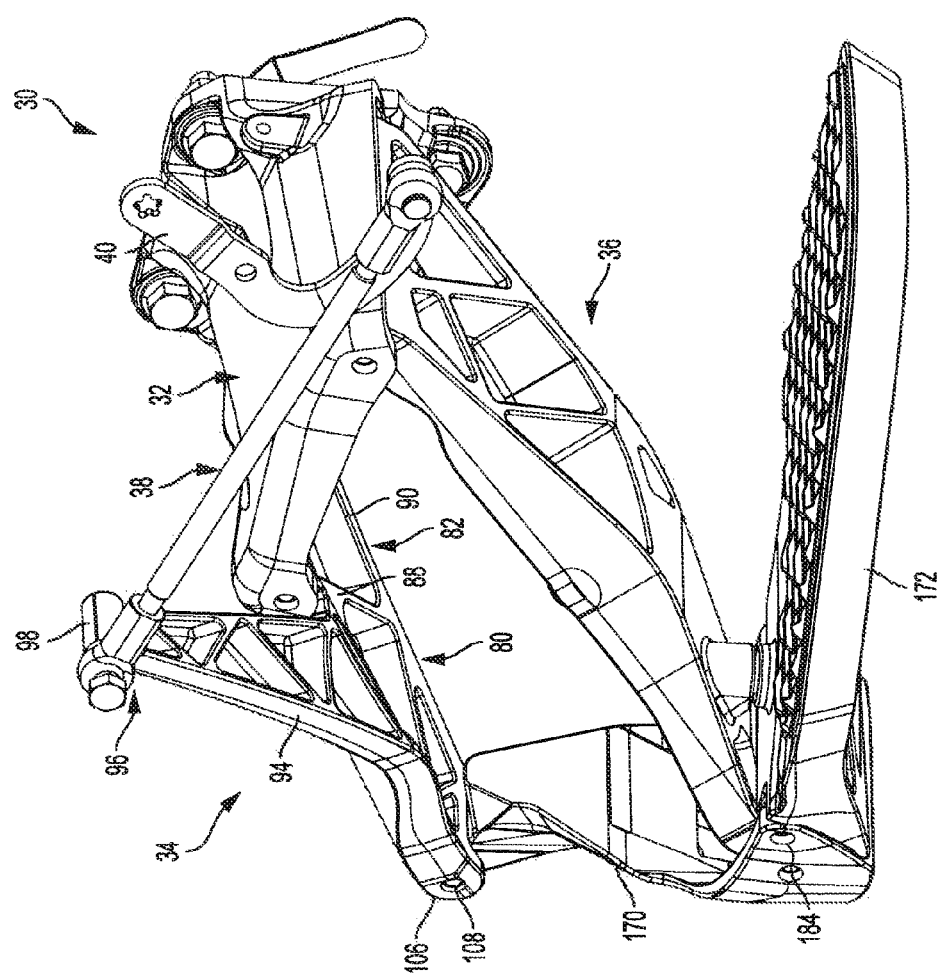
FIG. 7 is a perspective view of the deployable step system shown in FIG. 6 after assembly and in the retracted position, in accordance with the principles of the present disclosure.
Figure 8:
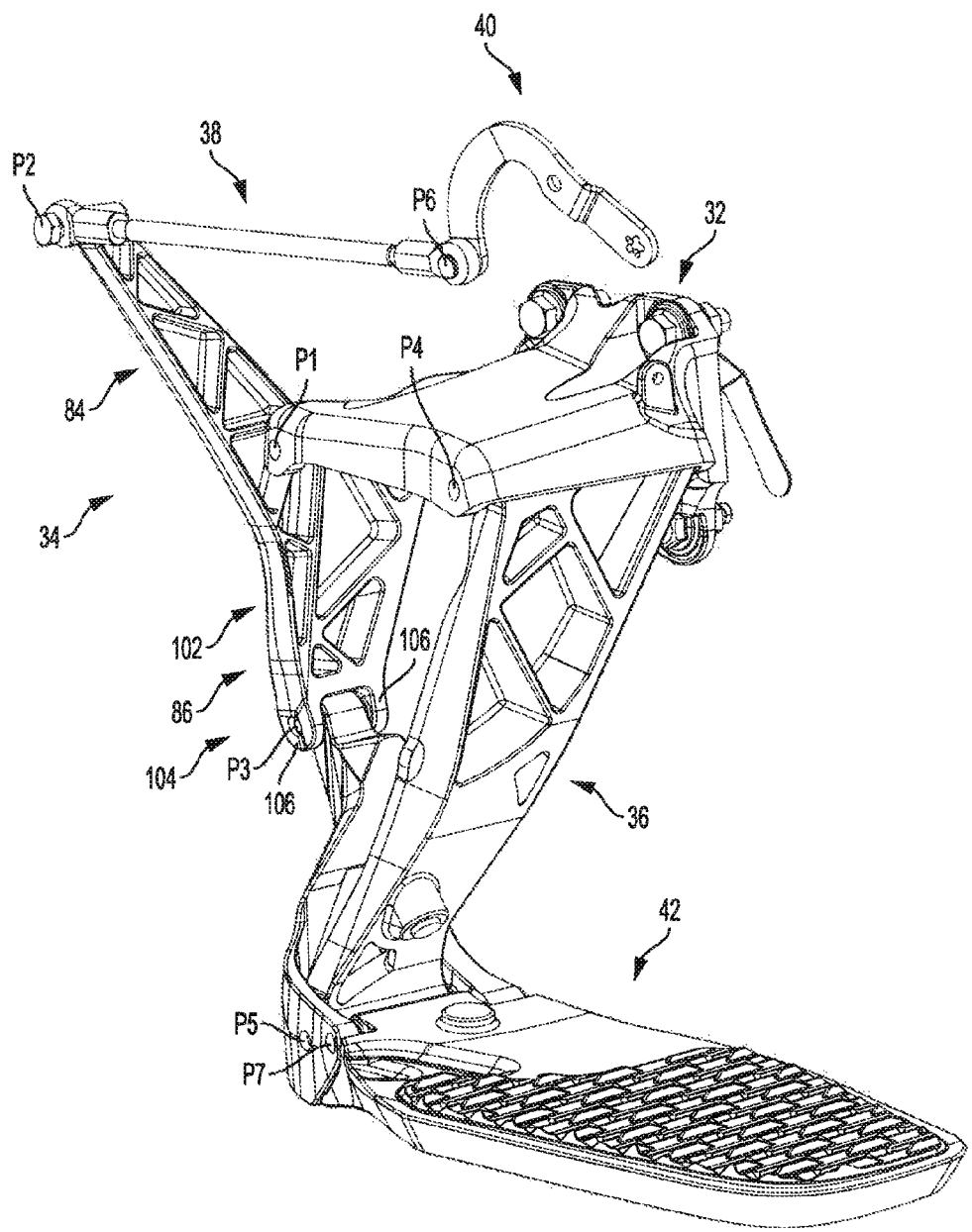
FIG. 8 is a perspective view of the deployable step system shown in FIG. 7 in the deployed position, in accordance with the principles of the present disclosure.

As illustrated in FIGS. 6-8, bell-crank lever 40 is generally hook-shaped and includes a first end 154 and an opposite second end 156. A first aperture 158 is formed in first end 154, and second and third apertures 160, 162 are formed in second end 156. First aperture 158 is configured to receive fastener 152 therethrough to pivotably couple lever 40 to drive rod 38 at pivot point 'P6'. Second aperture 160 is configured to receive a drive member 164 therethrough (see FIGS. 2-5).

In the example embodiment, drive member 164 is operably associated with the tailgate 20 such that rotation of tailgate 20 between the closed and open positions causes rotational movement of drive member 164 and thus bell-crank lever 40. For example, as shown in FIG. 4, lever 40 is positioned in a downward direction when tailgate 20 is in the closed position. Movement of tailgate 20 to the open position causes clockwise rotation (as viewed in FIGS. 4 and 5) of lever 40 to the position shown in FIG. 5. However, it will be appreciated that other drive systems may be utilized to automatically deploy step system 30 when tailgate 20 is moved to the open position. For example, an electric motor (not shown) may be coupled to drive member 164 and/or lever 40 in order deploy/stow step system 30 as described herein when tailgate 20 is moved to the open position.

As shown in FIG. 4, bell-crank lever third aperture 162 is configured to couple to a damper 166, which is configured to dampen movement of tailgate 20 from the open position to the closed position and thereby provide a controlled descent thereof.

In the example embodiment, step assembly 42 generally includes a pivot portion 170 and a step portion 172. Pivot portion 170 includes a main body 174 having a first pivot end 176 and an opposite second pivot end 178. First pivot end 176 includes a tongue or tubular sleeve 180 configured to be disposed between tabs 106 of third pivot arm extension 86. Tubular sleeve 180 is configured to receive pin 110 therein to pivotably couple first pivot end 176 to third pivot arm extension 86 at pivot point 'P3'.

Second pivot end 178 includes a pair of opposed flanges or tabs 182 each having an aperture 184 configured to receive a pin 186 therein to pivotably couple second pivot end 178 to aft pivot link second end 124 at pivot point 'P5'.

In the illustrated example, step portion 172 includes a proximal end 188, a distal end 190, and an upper surface 192. Proximal end 188 includes a tongue or tubular sleeve 194 configured to be disposed between tabs 182 of second pivot end 178. Tubular sleeve 194 is configured to receive a pin 196 therein to pivotably couple step portion 172 to pivot portion 170 at a pivot point 'P7'. This pivot enables step portion 172 to freely rotate upwards without damage to system 30 if step portion 172 comes into contact with the ground or other object.

A pad or step tread 198 is coupled to upper surface 192 and configured to provide a generally flat surface to receive a user's foot for accessing the cargo bed 12. Step tread 198 may include a pattern or texture configured to increase friction between step tread 198 and the user's foot. Upper surface 192 may also include a projection 200 extending upwardly therefrom and configured to engage stopper 140.

In operation, when tailgate 20 is in the closed position, auto deployed step system 30 is in the retracted or stowed position shown in FIGS. 1, 2, 4, and 7. In this position, step system 30 is stowed beneath the vehicle in the space aft of vehicle wheel 22, forward of rear bumper 24, beneath truck box underbody structure 14, and above trailer hitch departure plane 'DP1'.

As tailgate 20 is moved to the open position, drive member 164 is rotated in a clockwise direction (as viewed in FIGS. 4 and 5), which rotates bell-crank lever 40 in a clockwise direction (as viewed in FIGS. 4 and 5). This rotation of bell-crank lever 40 causes forward motion of drive rod 38 (toward the front of vehicle 10), which pushes second pivot arm extension 84 forward. This causes first pivot arm extension 82 to rotate about pivot point 'P1'.

As second pivot arm extension 84 rotates about pivot point 'P1', third pivot arm extension 86 is moved rearward (toward the rear of vehicle 10), which pushes step assembly pivot portion 170 rearward and similarly causes aft pivot link second end 124 to move rearward as it rotates about pivot point 'P5'. Aft pivot link first end 122 rotates about pivot point 'P4' as aft pivot link second end 124 moves rearward, thereby causing rearward movement of step portion 172 into the deployed position shown in FIGS. 3, 5, and 8.

In this position, step portion 172 is disposed rearward of bumper 24 and outward of opened tailgate 20 (see FIG. 2) to provide an assist step for a user stepping up to tailgate 20 and/or cargo bed 12. Moreover, in the deployed position, pivot point 'P7' enables step portion 172 to rotate upwards to a departure plane 'DP2' in the event the ground or other object contacts the underside of step portion 172.

In some embodiments, an angle 'α' of departure plane 'DP1' is equal to or substantially equal to an angle 'β' of departure plane 'DP2'. In other embodiments, angle 'α' is between approximately 18° and approximately 20° or between 18° and 20°. In still other embodiments, angle 'β' is between approximately 18° and approximately 20° or between 18° and 20°.

When the tailgate 20 is subsequently moved to the closed position, drive member 164 rotates bell-crank lever 40 in the opposite direction (e.g., counter-clockwise) causing forward pivot link 34 to automatically rotate about pivot 'P1' and return aft pivot link 36, and step assembly 42 to the stowed position shown in FIGS. 1, 2, 4, and 7.

Described herein are systems and methods for an automatically deployed assistance step system for a vehicle. The step system includes a plurality of pivotably connected links operably coupled to a vehicle door, such as a pickup truck tailgate. As the vehicle door is opened, the pivotably connected links are automatically rotated to move the step system to a deployed position. When the vehicle door is closed, the pivotably connected links are automatically rotated to move the step system back to the stowed position. As such, the step system can be stowed/deployed concurrently with manual closing/opening of the tailgate without any additional requirements of the user. The step presentation is ergonomically friendly and can be positioned in either the left side or right side (or both) of the rear of a pickup truck cargo bed assembly.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A step system for a pickup truck having a tailgate movable between a closed position and an open position, the step system comprising:

a mounting bracket configured to couple to the pickup truck;

a link system pivotably coupled to the mounting bracket and configured to operably and mechanically couple to the tailgate such that movement of the tailgate from the closed position to the open position automatically pivots the link system from a stowed position beneath the pickup truck to a deployed position rear of the pickup truck, and movement of the tailgate from the open position to the closed position automatically pivots the link system from the deployed position to the stowed position beneath the pickup truck; and a step portion coupled to the link system and configured to i) provide a step for an individual below the tailgate when the link system is in the deployed position, and ii) be stowed beneath the pickup truck when the link system is in the stowed position;

wherein the link system includes a forward pivot link, an aft pivot link, and a step assembly that includes the step portion, the forward pivot link pivotably coupled to the mounting bracket and the step assembly, the aft pivot link pivotably coupled to the mounting bracket and the step assembly;

wherein the step assembly comprises a pivot portion pivotably coupled to the forward pivot link and the aft pivot link, and the step portion pivotably coupled to the pivot portion to enable upward movement of the step portion.

2. The step system of claim 1, wherein the link system further comprises a drive rod and a lever, the drive rod pivotably coupled between the forward pivot link and the lever, the lever configured to operably couple to the tailgate.

3. The step system of claim 2, wherein the drive rod includes a first end pivotably coupled to the forward pivot link, and a second end pivotably coupled to the lever.

4. The step system of claim 2, wherein the lever is configured to receive a drive member coupled to the tailgate and configured to rotate when the tailgate is moved between the open and closed positions.

5. The step system of claim 1, wherein the forward pivot link comprises:
    a first pivot arm extension pivotably coupled to the mounting bracket;
    a second pivot arm extension configured to operably couple to the tailgate; and
    a third pivot arm extension pivotably coupled to the step assembly.

6. The step system of claim 1, wherein the aft pivot link includes a first end pivotably coupled to the mounting bracket, and a second end pivotably coupled to the step assembly.

7. The step system of claim 6, wherein the aft pivot link includes a top surface having a first stopper disposed in a first bore, and a bottom surface having a second stopper disposed in a second bore, the first stopper configured to selectively engage the forward pivot link, and the second stopper configured to selectively engage the step assembly.

8. A vehicle comprising:
    a tailgate movable between a closed position and an open position; and
    a step system mechanically coupled to the tailgate and movable between a stowed position beneath the vehicle and a deployed position rear of the vehicle, the step system including a step portion having a surface configured to provide a step below the tailgate when the step system is in the deployed position,
    wherein the step system is in the stowed position when the tailgate is in the closed position, and movement of the tailgate to the open position from the closed position automatically mechanically pivots the step system to the deployed position, and movement of the tailgate from the open position to the closed position automatically mechanically pivots the step system from the deployed position to the stowed position;
    wherein the step system includes a mounting bracket, a forward pivot link, an aft pivot link, and a step assembly that includes the step portion, the forward pivot link pivotably coupled to the mounting bracket and the step assembly, the aft pivot link pivotably coupled to the mounting bracket and the step assembly;
    wherein the step assembly comprises a pivot portion pivotably coupled to the forward pivot link and the aft pivot link, and the step portion pivotably coupled to the pivot portion to enable upward movement of the step portion.

9. The vehicle of claim 8, further comprising a drive member operably coupled between the tailgate and the step system, wherein the drive member is rotated when the tailgate is moved to the open position, the rotational movement causing the pivoting movement of the step system.

10. The vehicle of claim 8, wherein the step system further comprises a drive rod and a lever, the drive rod pivotably coupled between the forward pivot link and the lever, the lever operably coupled to the tailgate.

11. The vehicle of claim 10, wherein the drive rod includes a first end pivotably coupled to the forward pivot link, and a second end pivotably coupled to the lever, wherein the lever is configured to receive a drive member coupled to the tailgate and configured to rotate when the tailgate is moved between the open and closed positions.

12. The vehicle of claim 8, wherein the forward pivot link comprises:
    a first pivot arm extension pivotably coupled to the mounting bracket;
    a second pivot arm extension operably coupled to the tailgate; and
    a third pivot arm extension pivotably coupled to the step assembly.

13. The vehicle of claim 8, wherein the aft pivot link includes a first end pivotably coupled to the mounting bracket, and a second end pivotably coupled to the step assembly.

14. The vehicle of claim 8, wherein in the stowed position the step system is disposed in a space aft of a vehicle wheel, forward of a rear bumper of the vehicle, beneath a truck box underbody structure, and above a departure plane of a trailer hitch of the vehicle, and an outer profile of the step system is set inboard of and includes an outer profile that is contoured to an outer profile of the vehicle; and
    wherein in the deployed position, at least a portion of the step system is disposed rearward of the rear bumper and outward of the tailgate.

15. The vehicle of claim 8, wherein the step portion is movable upward to a step departure plane substantially equal to a departure plane of a trailer hitch of the vehicle when the step assembly is in the deployed position.

* * * * *